June 14, 1938.  N. TRBOJEVICH  2,120,636
DIFFERENTIAL AND AXLE DRIVE
Filed March 30, 1936
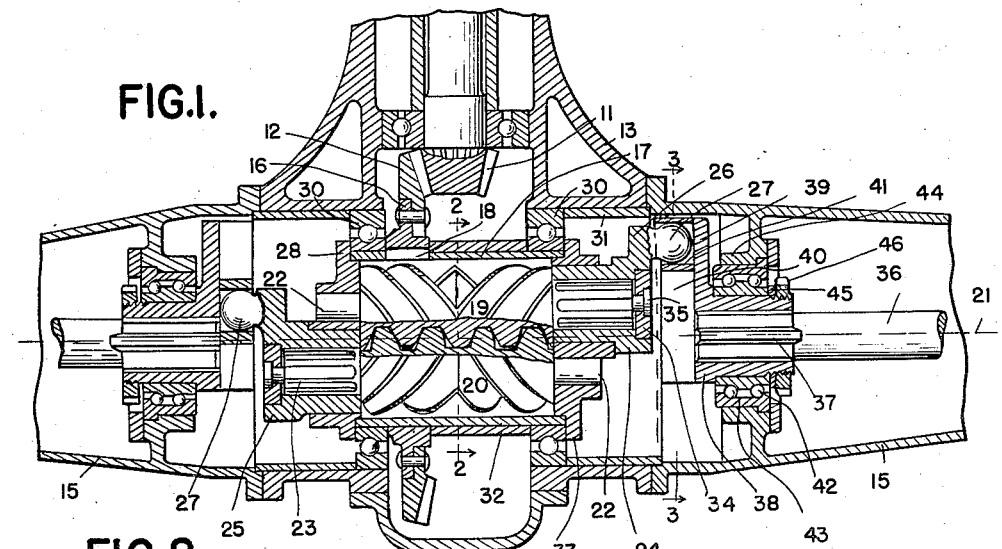
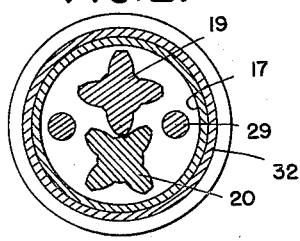
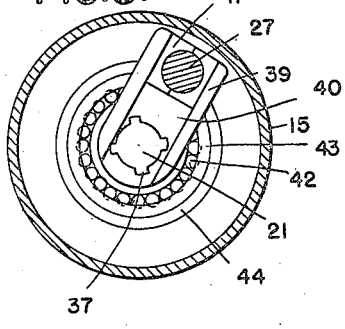
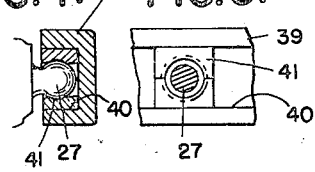
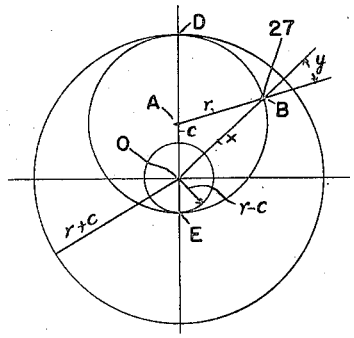
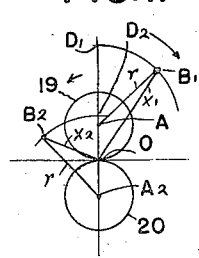
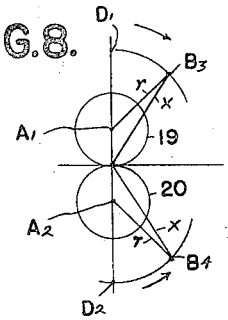
INVENTOR
NIKOLA TRBOJEVICH
BY Whittemore Hulbert
Whittemore & Belknap
ATTORNEYS Patented June 14, 1938

2,120,636

UNITED STATES PATENT OFFICE 2,120,636

DIFFERENTIAL AND AXLE DRIVE

Nikola Trbojevich, Detroit, Mich.

Application March 30, 1936, Serial No. 71,753

6 Claims. (Cl. 74—389.5)

The invention relates to a novel differential and axle driving mechanism of the type in which the differentiation is obtained by means of two mating pinions eccentrically mounted relative to the main axis, and the connection between the said pinions and the corresponding drive shafts is obtained by means of a pair of slotted cranks of the variable velocity or "quick return" type.

The novelty resides mainly in the principle or method according to which the wheel shafts are driven and differentiated. This is done by means of a lever and a flexible joint engaging a slot, the said lever being rotatable about two parallel axes at the same time viz: about the main axis to drive the wheels with a constant velocity or ratio, and about a secondary axis (the pinion axis) to obtain a differentiation at a variable velocity. The point is that by the virtue of this principle, which I believe I am the first to discover, an angular or linear misalignment of the wheel shafts relative to the main axis of the mechanism is immediately corrected and compensated for by the differential itself very much in the same fashion as a curved path of the vehicle is allowed for, i. e. the excess or deficiency in rotation of one wheel is carried over to the other wheel and equalized there.

The principal object is to prevent the breakage of shafts due to bending of the axle or any other misalignment. Another object is to produce a variable velocity differential which will prevent an excessive spinning of the idle wheel dynamically and without a recourse to friction. Still another object is to construct a differential in which the amount and degree of velocity variation is adjustable by adjusting the phase angle of the levers. A further object is to construct a capable differential of a long and slender form in order to slip over it a drive gear of a comparatively small diameter.

In the drawing:

Figure 1 is the main section of the differential taken through the wheel axis;

Figure 2 is a section thereof in the plane 2—2 of Figure 1;

Figure 3 is a section thereof in the plane 3—3 of Figure 1;

Figures 4 and 5 are detail views of the flexible joint driving the slotted crank 39;

Figures 6, 7, 8 and 9 are geometrical diagrams explanatory of the theory of this differential.

As shown in Figure 1, the mating bevel pinion 11 and ring gear 12 are mounted in the conventional manner in the axle housing comprising a carrier 13, a cover 14 and two shaft tubes 15 all bolted together. The ring gear 12 is riveted to the flange 16 and the latter is keyed to the spider tube 17 by means of keys 18. The differential proper consists of two similar double helical pinions 19 and 20 respectively, preferably of the Sykes type (without a gap in the middle) and having from two to four teeth meshing at parallel axes and having their line of contact in the main axis 21. Integrally with each pinion is formed a journal 22 at one end and a splined boss 23 at the other end, and the said parts in the two pinions are oppositely arranged as shown in the drawing. A pitman crank 24 is mounted upon each splined boss 23, said crank consisting of a neck portion 25 formed to a journal at its outside, the crank proper 26 and the driving ball or knuckle 27 at the end.

The spider assembly consists of two similar end plates 28 in which the journals 25 and 22 are rotatable, held together in proper alignment by means of the spider tube 17 and two bolts 29, Figure 2. The spider is rotatable in two main bearings 30 of the deep groove ball type, the said bearings being held in the carrier 13 by means of the sleeve formed spacers 31 and 32, and the flanges 33 of the end plates 28. The pitman arm 24 is prevented from pulling out by means of the washer 34 and the bolt 35.

The drive shafts 36 are formed to splines 37 at their ends nearest to the spider and fit into the corresponding holes formed in the neck 38 of the slotted cranks 39. The slot 40 is preferably radial and of a rectangular cross-section, see Figures 3 and 4, to house the ball 27 reinforced by a rectangular split frame or collar 41. The crank 39 is rotatable in the double row ball bearing 42, the outer race 43 of which is pressed into the corresponding ribbed boss 44 integral with the shaft tube 15 and held in that position by means of a washer 45 and an adjusting nut 46.

Regarding the assembling of the differential, note that when the two cranks 25 are so assembled that the balls 27 both point upwardly as shown in Figure 1, the ball on the left side will have a minimum arm while the one to the right has a maximum arm about the main axis 21. In this relative position of the cranks, corresponding to a phase angle of zero, the velocity variation of the differential is at its maximum. However, when the two cranks 25 are assembled at the phase angle of one hundred eighty degrees (180°) that is, diametrically opposite of each other, the velocity variation in one pair of cranks is exactly counteracted by the opposite variation in the other pair point for point, and the ratio is constant and equal to one throughout the cycle. Intermediate variations of velocity are obtained by adjusting the cranks at intermediate phase angles. This feature is of some practical consequence in that it is now possible to determine experimentally in a vehicle by varying the phase angle of the levers just what velocity variation in the differential is the most effective in stopping the spinning and skidding of the wheels.

The geometry of this mechanism will now be briefly discussed. In Figure 6, let A be the axis of the pinion; O the axis of the ring gear and the drive shafts; B the momentary position of the ball 27; r the radius of the pitman arm coupled to the pinion axis; x (variable) the radius of the slotted arm and c=AO the pitch radius of the pinion. Then, the maximum ratio $R_{max.}$ will occur when the contact is at the point D.

No. 1 $$R_{max.} = \frac{r+c}{r}$$

The minimum ratio occurs at the point E.

No. 2 $$R_{min.} = \frac{r-c}{r}$$

The total variation of ratio in one pair of cranks is:

No. 3 $$\frac{R_{max.}}{R_{min.}} = \frac{r+c}{r-c}$$

and in both pairs when in series (zero phase angle):

No. 4 $$R_o = \left(\frac{r+c}{r-c}\right)^2$$

In the drawing, Figure 1, $r=2''$, $c=1''$, $R_o=9$, which is probably too much for ordinary driving. At any other point, such as B, the ratio is readily determined by differential calculus. Thus, No. 5 $$R = \frac{x \cos y}{r}$$

Figure 7 shows the arrangement of the cranks for the zero phase angle above discussed. Starting from the points $D_1$ and $D_2$ respectively, the pitmans move to $B_1$ and $B_2$ describing the same angles but in opposite directions as indicated by the arrows. The overall ratio starting from the first (left side) shaft at 0 will be:

No. 6 $$R_1 = \frac{x_2 \cos y_2}{r} \times \frac{c}{c} \times \frac{r}{x_1 \cos y_1} = \frac{x_2 \cos y_2}{x_1 \cos y_1}$$

for $$y_1 = y_2 = 0$$
$$x_2 = r - c$$
$$x_1 = r + c$$
$$R_1 = \frac{r-c}{r+c}$$

Figure 8 represents the arrangement of pitmans for one hundred eighty degree (180°) phase angle. Again, the angle $D_1 A_1 B_3 = D_2 A_2 B_4$. But now, due to the symmetrical arrangement $x_1 = x_2$ and $y_1 = y_2$ at all instants. Substituting these values in the Equation No. 6, it is seen that $R_1 = 1$, i. e. the mechanism transforms into a constant velocity differential.

Figure 9 diagrammatically shows the method of compensation when the shaft axis is moved away from the main axis O to a point F through misalignment, accident etc. The wheel shaft F although eccentric relative to the main axis naturally tends to rotate with a uniform velocity being geared to the road by means of the tire friction and this mechanism permits it to do so. In an ordinary differential and axle a misalignment of this magnitude would be disastrous, but here it simply means a little more work for the differential. As the angular velocities about the axes O and F are now equal, the angles LOM, GOK and GFH are also equal. The rotation GOK brings the center of the pinion from L to M and the driving ball from G to K while the rotation GFH brings it back from K to H, thus rotating the pinion through the minute angle HMK backwards. This minute rotation is transmitted through the pinions 18 and 19 to the other wheel and a kind of rocking motion ensues between the two wheels until a point of equilibrium is found, due to the variable velocity feature, in which neither wheel skids over the ground. These conditions are difficult to comprehend, but I constructed an accurate model and the experiments performed with it seem to prove that this theory is correct.

Regarding the self-locking effect of this differential obtained by means of a velocity variation imparted to the spinning wheel, it may be said that the principle itself is not new and its correctness has been proved in practice, time and again.

What I claim as my invention is:

1. A differential comprising a spider rotatable about an axis, two mating pinions rotatable therein and symmetrically disposed relative of the said axis, one crank at the end of each pinion and at opposite ends of the spider, two drive shafts co-axial with the spider, two cranks mounted upon the said shafts, and a pin sliding in a substantially radial slot connecting the first and second cranks respectively to transmit a torque.

2. A differential comprising two epicyclic mating pinions rotatable in a spider, two drive shafts co-axial with the said spider, one pitman mounted at the end of each pinion at opposite ends of the spider and one slotted lever at each shaft engaging the said pitman to transmit rotation at a variable rate.

3. A vehicle axle comprising a driving gear, a spider, two epicyclic mating pinions rotatable therein, two drive shafts co-axial with the spider, a variable velocity means for transmitting rotation from each pinion to its corresponding shaft at each end of the spider, a housing enclosing the mechanism and means for adjusting the phase angle of the said variable velocity mechanisms relative to each other in order to increase or decrease the overall cyclical velocity variation at will from zero to a predetermined maximum.

4. A differential comprising two epicyclic mating pinions rotatable in a spider, two drive shafts co-axial with the said spider and a pin and slot mechanism at each end of the spider capable of transmitting rotation from each pinion to its corresponding shaft with a cyclically varying velocity in which the said two pin and slot mechanisms are adjustable relative to each other to form a phase angle, thus regulating the amount of velocity variation within a cycle.

5. In a vehicle axle, the combination of a rotary spider containing two rotatable mating pinions symmetrically disposed relative to the spider axis, two drive shafts co-axial with the said spider but rotatable in separate and independent bearings and two pairs of variable velocity levers mating in the manner of a pin and slot connecting a pinion and a shaft drivingly to each other at each end of the spider.

6. A differential comprising two epicyclic mating pinions rotatable in a spider, two drive shafts substantially co-axial with the said spider and a pin and slot mechanism at each end of the spider connecting the ends of the shafts at their corresponding pinions by means of a spherical joint, thus permitting a limited misalignment of the two shafts.

NIKOLA TRBOJEVICH.